US006792456B1

(12) United States Patent
Hellerstein et al.

(10) Patent No.: US 6,792,456 B1
(45) Date of Patent: Sep. 14, 2004

(54) SYSTEMS AND METHODS FOR AUTHORING AND EXECUTING OPERATIONAL POLICIES THAT USE EVENT RATES

(75) Inventors: Joseph L. Hellerstein, Ossining, NY (US); Sheng Ma, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/567,445

(22) Filed: May 8, 2000

(51) Int. Cl.$^7$ ........................ G06F 15/173; G06F 11/00
(52) U.S. Cl. ........................ 709/224; 714/39; 714/47
(58) Field of Search ........................ 709/203, 224; 714/25, 39, 47; 713/340, 502, 503

(56) References Cited

U.S. PATENT DOCUMENTS

| | | | |
|---|---|---|---|
| 4,325,122 A | | 4/1982 | Parks et al. |
| 5,402,412 A | | 3/1995 | Duffie et al. |
| 5,761,411 A | | 6/1998 | Teague et al. |
| 5,996,090 A | | 11/1999 | Hellerstein |
| 6,317,786 B1 | * | 11/2001 | Yamane et al. ............. 709/224 |
| 6,336,139 B1 | * | 1/2002 | Feridun et al. ............. 709/224 |
| 6,405,212 B1 | * | 6/2002 | Samu et al. ............. 707/103 R |
| 6,415,277 B1 | * | 7/2002 | Klatt et al. ............. 707/1 |
| 6,446,136 B1 | * | 9/2002 | Pohlmann et al. ............. 709/318 |
| 6,493,755 B1 | * | 12/2002 | Hansen et al. ............. 709/224 |
| 6,553,403 B1 | * | 4/2003 | Jarriel et al. ............. 709/202 |

OTHER PUBLICATIONS

Computer Associates International, "Neugents. The Software That Can Think," http://www.cai.com/neugents, 1 page, Jul. 16, 1999.

M. Iguchi et al., "Detecting Malicious Activities Through Port Profiling," IEICE Trans. Inf. System., vol. E82–D, No. 4, pp. 784–792, Apr. 1999.

J. Jiao et al., "Minimizing the Monitoring Cost in Network Management," Integrated Network Management VI, IFIP, pp. 155–169, 1999.

Smarts, "About Code Book," http://www.smarts.com/codebook.html, 1 page, 1999.

S.A. Yemini et al., "High Speed and Robust Event Correlation," IEEE Communications Magazine, pp. 82–90, May 1996.

K.R. Milliken et al., "YES/MVS and the Automation of Operations for Large Computer Complexes," IBM Systems Journal, vol. 25, No. 2, pp. 159–180, 1986.

* cited by examiner

Primary Examiner—Krisna Lim
(74) Attorney, Agent, or Firm—Rafael Perez-Pineiro; Ryan, Mason & Lewis, LLP

(57) ABSTRACT

Systems and methods are described for the execution and authoring of policies that use event rates for event management. The first system addresses policy execution. Included in this system are: a controller that provides overall operational control, a grouping engine, a rate detector, and a rate diagnoser. The second system automates the construction of event rate policies based on primary information sources (e.g., topology, inventory). The components of this system include: an authoring user interface, source-specific hierarchy generators, an event group generator and hierarchy builder, and a threshold constructor.

62 Claims, 14 Drawing Sheets

SYSTEMS AND METHODS FOR AUTHORING AND EXECUTING OPERATIONAL POLICIES THAT USE EVENT RATES

FIELD OF THE INVENTION

The present invention relates generally to network and systems management and, more particularly, to detecting and resolving availability and performance problems.

BACKGROUND OF THE INVENTION

With the dramatic decline in the price of hardware and software, the cost of ownership for computing devices is increasingly dominated by network and systems management. Included here are tasks such as establishing configurations, help desk support, distributing software, and ensuring the availability and performance of vital services. The latter is particularly important since inaccessible and/or slow services decrease revenues and degrade productivity.

The first step in managing availability and performance is event management. Almost all computing devices have a capability whereby the onset of an exceptional condition results in the generation of a message so that potential problems are detected before they lead to widespread service degradation. Such exceptional conditions are referred to as "events." Examples of situations in which events are generated include: unreachable destinations, excessive CPU consumption, and duplicate IP addresses. An event message contains multiple attributes, especially: (a) the source of the event, (b) type of event, and (c) the time at which the event was generated.

Event messages are sent to an "event management system (EMS)." In existing art, such systems are policy-driven, which means that external descriptions are used to specify the event patterns for which actions are taken. Thus, an EMS has separate subsystems for policy execution and policy authoring. The latter provides a means for the operations staff to construct policies. The former provides for the processing of event messages. In existing art, an EMS has repositories for policies, events, and configuration information used in event management.

Upon arrival of an event message, the policy execution system parses the message to translate it into a normalized form (e.g., by isolating fields instead of having a single text string). This normalized information is then placed into an event repository. Next, the normalized event is fed into a "correlation engine" that processes events as specified by operational policies that address considerations such as:

1. Elimination of duplicate messages. Duplicate is interpreted broadly here. For example, if multiple hosts on the same local area network generate a destination unreachable message for the same destination, then the events contain the same information.

2. Maintenance of operationial state. State may be as simple as which devices are up and which are down. It may be more complex as well, especially for devices that have many intermediate states or special kinds of error conditions (e.g., printers).

3. Problem detection. A problem is present if the services cannot be delivered in accordance with a service level agreement (which may be formal or informal). This could be the result of a device failure, exceeding some internal limit (e.g., buffer capacity), or excessive resource demands.

4. Problem isolation. This involves determining the components that are causing the problem. For example, distributing a new release of an application that has software errors can result in problems for all end-users connecting to servers with the updated application.

Items (1) and (2) are, in some sense, intermediate steps to (3) and (4). Thus, we focus on the latter two.

The correlation engine provides automation that is essential for delivering cost effective management of complex computing environments. Existing art provides three kinds of correlation. The first employs operational policies expressed as rules, e.g., K. R. Milliken et al., "YES/MVS and the Automation of Operations for Large Computer Complexes," IBM Systems Journal, Vol 25, No. 2, 1986. Rules are if-then statements in which the if-part tests the values of attributes of individual events, and the then-part specifies actions to take. An example of such a rule is "If multiple hosts on the same LAN cannot reach the same destination, then alert the operator that there is a connectivity problem from the LAN to the destination." The industry experience has been that such rules are difficult to construct, especially if they include installation-specific information.

Another approach has been developed by SMARTS, see, e.g., SMARTS, "About Code Book," http://www.smarts.com/codebook.html, 1999. SMARTS is based on the concept of a codebook that matches a repertoire of known problems with event sequences observed during operation. Here, operational policies are models of problems and symptoms. Thus, accommodating new problems requires properly modeling their symptoms and incorporating their signatures into the code book. In theory, this approach can accommodate installation-specific problems. However, doing so in practice is difficult because of the high level of sophistication required. Further, the SMARTS technology only applies to known problems.

Recently, a third approach to event correlation has been proposed by Computer Associates International, see, e.g., Computer Associates International, "Neugents. The Software that can Think," Jul. 16, 1999, http://www.cai.com/neugents. This approach trains a neural network to predict future occurrences of events based on the frequency of their occurrence in historical data. Typically, events are specified based on thresholds such as, for example, CPU utilization exceeding 90%. The policy execution system uses the neural network to determine the likelihood of one of the previously specified events occurring at some time in the future. While this technique can provide advanced knowledge of the occurrence of an event, it still requires specifying the events themselves. At a minimum, such a specification requires detailing the following:

1. The variable measured (e.g., CPU utilization);
2. The directional change considered (e.g., too large); and
3. The threshold value (e.g., 90%).

The last item can be obtained automatically from examining representative historical data. Further, graphical user interfaces can provide a means to input the information in items (2) and (3). However, it is often very difficult for installations to choose which variables should be measured and the directional change that constitutes an exceptional situation.

To summarize, existing art uses a micro approach to event correlation. That is, existing correlation engines analyze individual events and their interrelationships. While such an approach has value, it has severe limitations as well. Foremost, existing art requires an expert to develop the operational policies that drive the analysis. As a result, it is difficult for installations to define and maintain customized operational policies.

SUMMARY OF THE INVENTION

The present invention provides systems and methods to simplify and customize the automation of event management. The invention is based on at least the following observation: big problems generate lots of events. This observation suggests a macro approach to event correlation that focuses on the rate at which events are generated rather than their detailed interrelationships.

To illustrate our approach, consider a connectivity problem that occurs between hosts on subnet 82.13.16 and the host 93.16.12.54. Existing art would detect such problems by having rules that examine the event type ("destination unreachable") and identify that the hosts generating this message are on the same subnet. In contrast, the present invention detects such problems based on the rate at which messages are generated by hosts on the subnet. An event rate threshold is obtained from historical data. If the rate exceeds this threshold, then an alarm is raised. This leads to the rule: "If event rates on a LAN exceed the LAN-specific threshold, raise an alarm."

Once a problem is detected, event rates provide a way to diagnosis the problem. This is achieved by exploiting the structure of the attributes of events. Consider the example in the preceding paragraph. Once an excessive event rate is detected, we want to know its cause. This can be achieved by further classifying events based on their attributes, such as event type, the kind of host (e.g., file server, domain name server), and time of day. In the example, we find that the increased event rates can be attributed to events with the type "destination unreachable." This information is obtained through automation that looks for common characteristics among events based on hierarchies of event attributes. Examples of such hierarchies include: time hierarchy, comprising hours, minutes, and seconds; and configuration hierarchy, comprising campus, subnet, and host. The present invention provides systems and methods for merging individual attribute hierarchies into a single event hierarchy. Given this merged hierarchy, techniques such as those described in U.S. Pat. No. 5,996,090 to Joseph L. Hellerstein entitled "Method and Apparatus for Quantitative Diagnosis of Performance Problems Using External Representations," the disclosure of which is incorporated by reference herein, can be applied to obtain a quantitative diagnosis for the cause of large event rates.

Event rate analysis uses threshold tests on event rates. As such, constructing event rate policies requires specifying: (a) the set of events to consider, (b) the directional change of interest, and (c) threshold values for event rates. Based on the premise of the analysis of the invention, the directional change of interest for (b) is larger event rates (although the invention is sufficiently flexible to accommodate other kinds of threshold violations as well). Item (c) can be obtained from representative historical data once (b) is specified. Thus, to specify detection policies using event rates only requires describing the set of events that are to be counted in the rates.

We use the term "event group" to describe a collection of events that are used to compute an event rate. Thus, in the correlation component described herein there is an event grouping component that is responsible for identifying the group or groups to which an event belongs. We use the term "event group descriptor" to indicate a way of specifying the events that are members of an event group. The present invention employs event group descriptors akin to a where-clause in a Structured Query Language (SQL) query. Examples of event group descriptors include: events from the same subnet, events with type "destination unreachable," and events generated within a 15 second interval.

By employing event group descriptors, we can automate the construction of the if-part of event rate policies. This is sufficient in many cases since the then-part often just consists of sending a message to the operator. The general form for the policies we consider is:

If rate of event-group-1 violates threshold-1 and . . . rate of event-group-N violates threshold-N, then . . .

Note that this is equivalent to generating new events for each threshold violated and then employing a traditional rule-based system that tests for each of these events. Further, note that "violates a threshold" is intended to be interpreted broadly to mean that the event rate violates a predetermined event rate criterion. For example, the event rate may be too large, or too small when compared to a threshold value, or the event rate may fall outside an interval or lie within an interval when compared to a threshold range.

Thus, the burden that the present invention imposes on the operations staff is to specify the event group descriptors. Although this is easier to do than the requirements of existing art, we provide techniques that further simplify this task. Our observation is that the appropriate way to form groups of events is, in part, determined by information about the computer installation. For example, it is natural to group events based on the segment, LAN, and campus from which they emanate. This information forms a hierarchy for grouping hosts and hence events. Many installations have such information in a configuration database. Thus, it is straightforward to construct an engine that processes this data into a hierarchy of attribute values. Further, there are many such information sources, including host inventory (e.g., choice of OS (operating system), OS release level, OS patch level) and event type. In addition, note that given these hierarchies, it is straightforward to isolate the cause of excessive event rates using techniques such as those in the above-referenced U.S. Pat. No. 5,996,090.

The present invention comprises two interrelated systems. The first is a correlation engine that executes event rate policies. The second is an authoring system whereby event rate policies are specified. These policies may have the following components:

(1) Event group descriptors, which specify the conditions for membership in an event group;

(2) Event group thresholds, which quantify what constitutes an excessive event rate for an event group;

(3) Event group hierarchies, which provide a generalization-specialization hierarchy for event groups;

(4) Event group actions, which detail the tasks to execute when the if-part of an event rate policy is satisfied.

The last component is well known art and so is not addressed in detail.

The correlation engine that executes policies that use event rates may have the following elements:

(1) grouping engine, which determines the groups to which events belong;

(2) rate detector, which determines if the rate of events for an event-group exceeds its threshold;

(3) rate diagnoser, which uses event group hierarchies to isolate the cause of excessive event rates.

The method for the correlation engine of our invention may have two parts. The first concerns the arrival of a new event, which includes the steps: (a) identifying the event groups to which an event belongs; and (b) incrementing counts for the identified groups. The second is a task that is executed periodically to check event rates and to perform diagnosis for those event groups that have excessive rates.

The authoring system in the present invention may have components for:

(1) an administrative interface that aids in constructing event group descriptors, selecting thresholds, and specifying event group hierarchies;

(2) an event group and hierarchy builder that provides a way to automate the construction of group descriptors and group hierarchies; and (3) a threshold constructor that provides automation for estimating thresholds.

The methods for the authoring system involve end-user interactions that combine automated construction of event rate policies, event group hierarchies, and event rate thresholds with manual updates to adjust what the automation produces.

Event rates have been employed in various ways. In U.S. Pat. No. 4,325,122 to Parks et al., an application to wind prospecting and an apparatus that efficiently integrates event counts is described. In U.S. Pat. No. 5,761,411 to Teague et al., ways to predict disk failures based on disk errors (or events) are described. U.S. Pat. No. 5,402,412 to Duffie et al. describes means for monitoring events so that they do not exceed a pre-specified rate for each user. However, none of this art concerns itself with correlation engines for event management. Nor does any of this art address the execution or authoring of event rate policies.

More specifically, event rates have been used within network and systems management. For example, Jia Jiao et al., "Minimizing the Monitoring Cost in Network Management," Integrated Network Management VI, IFIP, pp. 155–170, 1999, describes a scheme whereby polling rates are adjusted based on the rate at which events are received. M. Iguchi and S. Goto, "Detecting Malicious Activities Through Port Profiling," IEICE Trans. Inf. Syst., Vol. E82-D, No. 4, pp. 784–92, April 1999, disclose a way to detect malicious users using event rates. However, in neither case are the event rates used in operational policies. And, in neither art is there an authoring system through which administrators construct installation-specific policies aided by automation that exploits operational information such as topology and inventory.

There are at least two areas in which the present invention provides benefits. The first relates to customized event management. In existing art, providing installation customization requires specifying the events of interest (e.g., "unreachable destination," "ping timeout") and their relationships (e.g., the unreachable host does not respond to a ping). Such an approach requires considerable expertise on the part of the operations staff, a requirement that is hard to satisfy given the dearth of experts. The present invention greatly reduces the expertise required to specify operational policies for problem detection and diagnosis based on the use of event rates. The inventive systems and methods for execution of event rate policies only require specifying event groups of interest (e.g., hosts that are on the same LAN). Further, with the inventive systems and methods for authoring event rate policies, event groups can be specified automatically based on primary information sources such as topology and inventory information.

Another benefit of the invention is that problem detection and isolation can be done for situations that are not known a priori. Existing art focuses on specific problems, such as IP (Internet Protocol) connectivity and configuration errors. This is done by looking for event sequences that are signatures of these problem types. In contrast, the present invention provides systems and methods to address problems without prior knowledge of their characteristics if they are manifested by a change in event rate. Our experience with production systems has shown that problems as diverse as router configuration errors, invalid hub programs, and security intrusions can all be detected through changes in event rates.

We note in passing that the present invention may be a complement to existing art in addition to a replacement for it. Clearly, it is desirable to use prior knowledge of problems when this knowledge exists (and is fairly static). The invention extends the capability of event management automation to increase customization and to address the detection and isolation of unknown problems.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative system architecture. However, it is to be understood that the present invention is not limited to any particular system architecture or application to the management of a particular type of event. Rather, the invention is more generally applicable to any system architecture and application in which it is desirable to simplify and customize the automation of event management by use of event rates.

Figure 1:
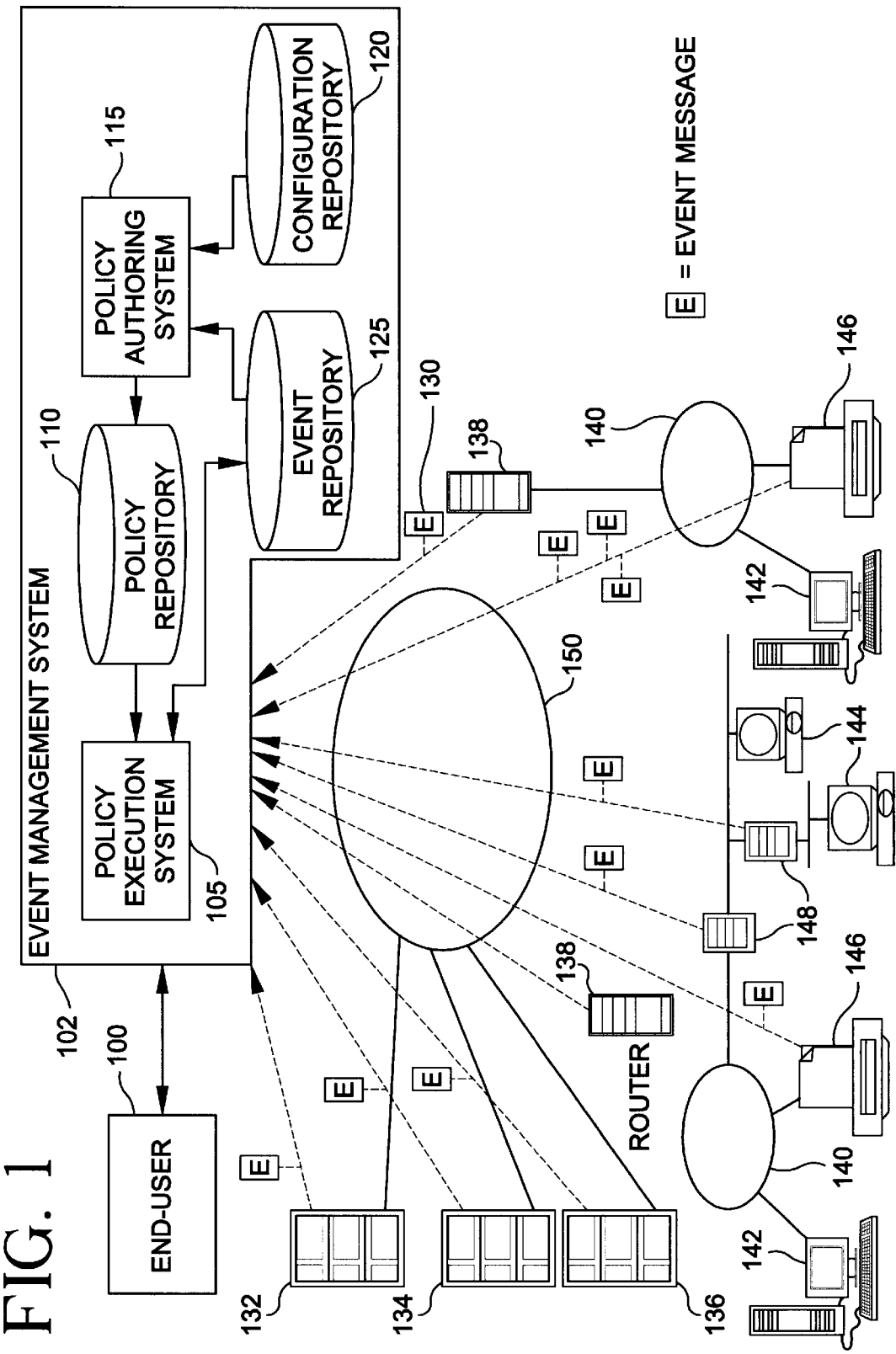
FIG. 1 is a block diagram illustrating an overall architecture of an event management system according to one embodiment of the present invention in the context of a network with which the present invention may be employed.

Referring to FIG. 1, a block diagram illustrates an overall architecture of an event management system according to one embodiment of the present invention in the context of an exemplary system of computing devices with which the present invention may be employed. As shown, an administrative end-user 100 interacts with an event management system 102 to receive different classes of event messages and to author policies for event management. Events 130 are generated by computing devices of various types. The computing devices are connected to the event management system 102 via a network 150. The network 150 may be, for example, a public network (e.g., Internet), a private network, and/or some other suitable network. The computing devices may include, for example, file servers 132, name servers 134, mail servers 136, routers 138, wherein the routers provide connection to the network 150 for work stations 142 and 144, print servers 146 and hubs 148 through subnetworks 140. As shown, the event management system 102, itself, comprises a policy execution subsystem 105 and a policy authoring subsystem 115. In addition, the event management system 102 comprises repositories for policies 110, events received 125 and configuration information 120. Detailed explanations of these components of the event management system 102 will be provided below.

Figure 2:
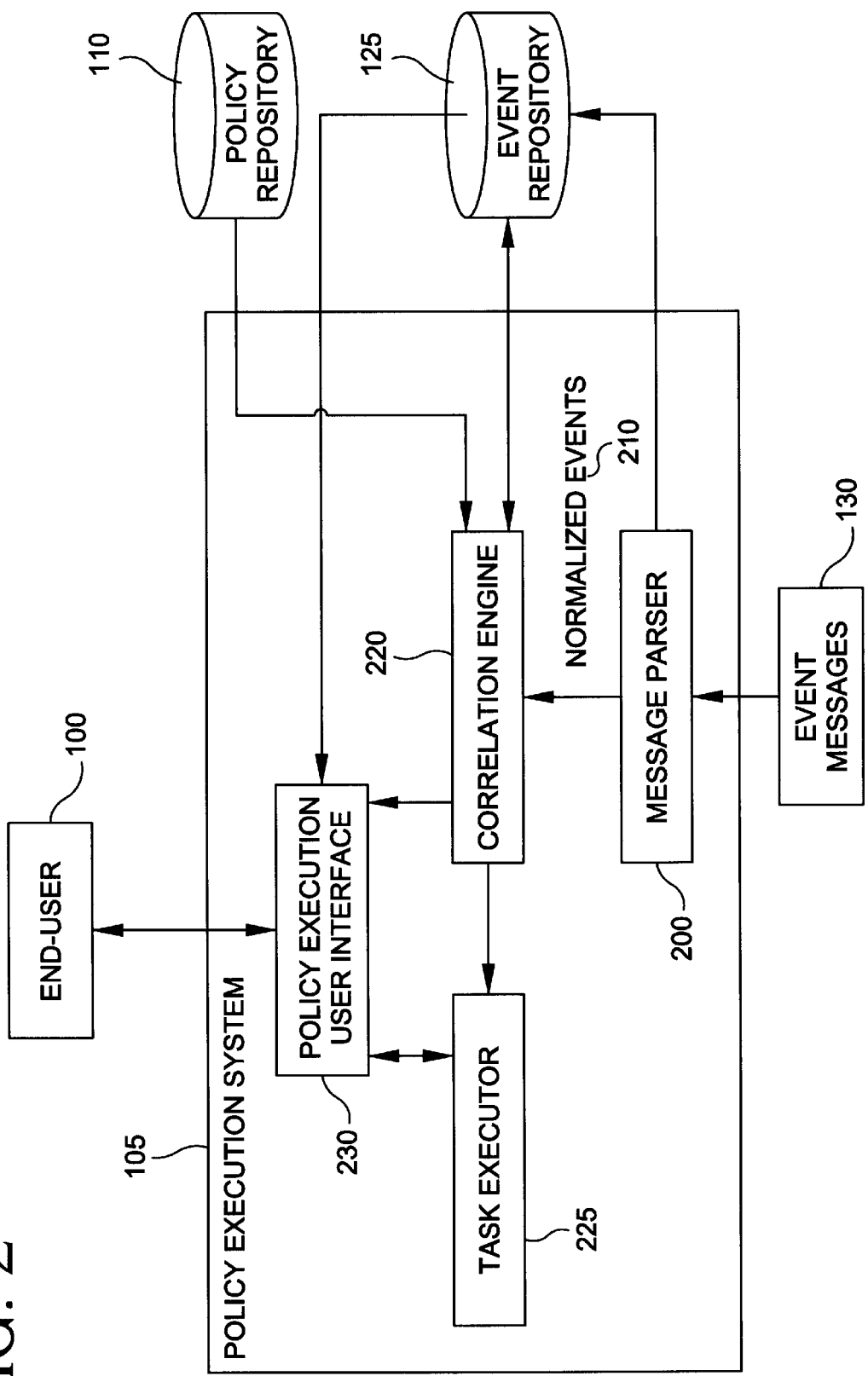
FIG. 2 is a block diagram illustrating components of a policy execution system according to one embodiment of the present invention.

Referring now to FIG. 2, a block diagram illustrates components of a policy execution system 105 according to one embodiment of the present invention. As shown, the policy execution system 105 comprises a message parser 200 for generating normalized event messages 210, a correlation engine 220, a task executor 225 and a policy execution user interface 230. Further, the correlation engine 220 is connected to the policy repository 110, while the user interface 230, the correlation engine 220 and the message parser 200 are connected to the event repository 125. Thus, in operation, event messages 130 are parsed by the message parser 200 that produces normalized events 210 that are stored in the event repository 125 and forwarded to the correlation engine 220. The correlation engine interprets policies based on normalized events. The execution of the then-part of a policy is performed by the task executor 225. The results of task execution and the event correlation are made available to the policy execution user interface 230 through which the administrative end-user 100 interacts.

Figure 3:
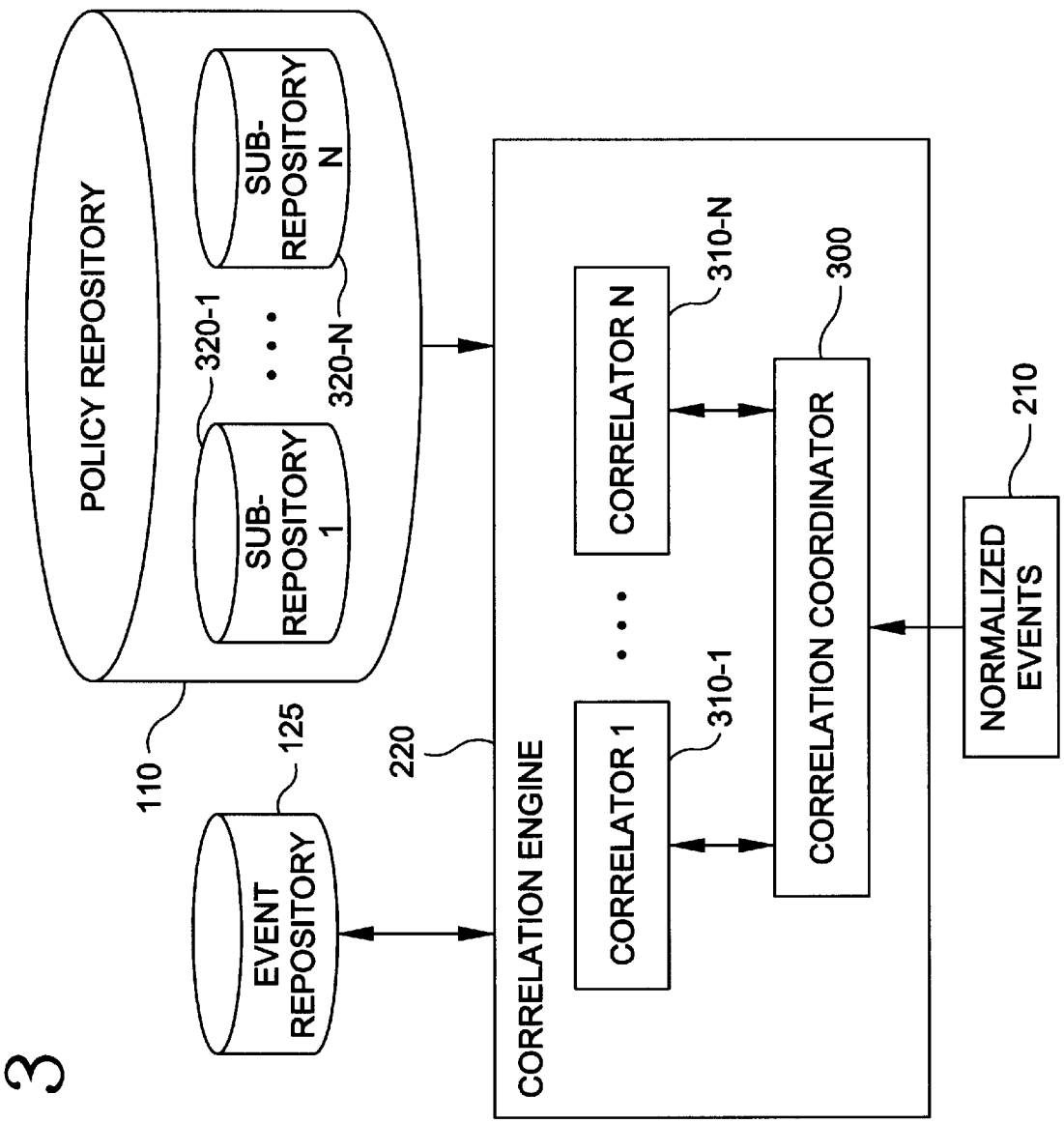
FIG. 3 is a block diagram illustrating an architecture that provides for integration of multiple correlators according to one embodiment of the present invention.

Referring now to FIG. 3, a block diagram illustrates an architecture that provides for integration of multiple correlators according to one embodiment of the present invention. Specifically, FIG. 3 illustrates one embodiment of a correlation engine 220 according to the invention. As shown, the correlation engine 220 comprises a correlation coordinator module 300 and correlators 1 through N (310-1 through 310-N). Thus, in operation, normalized events 210 are supplied to the correlation coordinator 300 that invokes one or more individual correlator components 310-1 through 310-N. These components use information from the event repository 125 and the policy repository 110. The latter is decomposed into multiple sub-repositories 320-1 through 320-N that correspond to each correlator.

Figure 4:
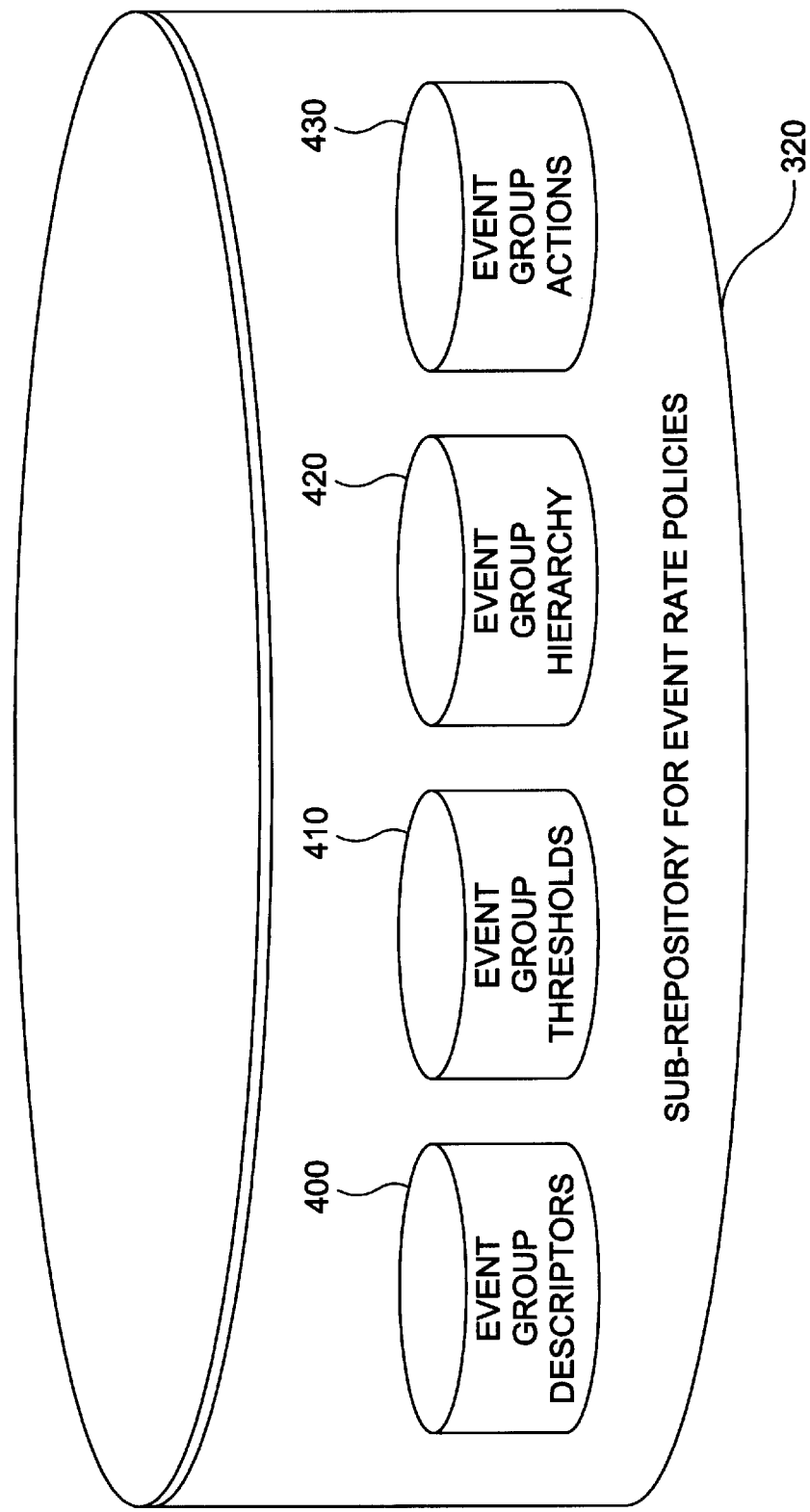
FIG. 4 is a block diagram illustrating elements of event rate policies according to one embodiment of the present invention.

Referring now to FIG. 4, a block diagram illustrates elements of event rate policies according to one embodiment of the present invention. Specifically, FIG. 4 illustrates the components of a sub-repository (320-1 through 320-N in FIG. 3) for event rate policies. There are four such components: (i) the event group descriptors 400, which contains a representation and identification for each event group; (ii) the event group thresholds 410, which specify the criteria for an exceptional event rate (e.g., too high, too low, within an interval, outside an interval); (iii) the event group hierarchy 420, which is a directed acyclic graph of event groups; and (iv) event group actions 430, which are the tasks to execute when an event rate violates its threshold.

Figure 5:
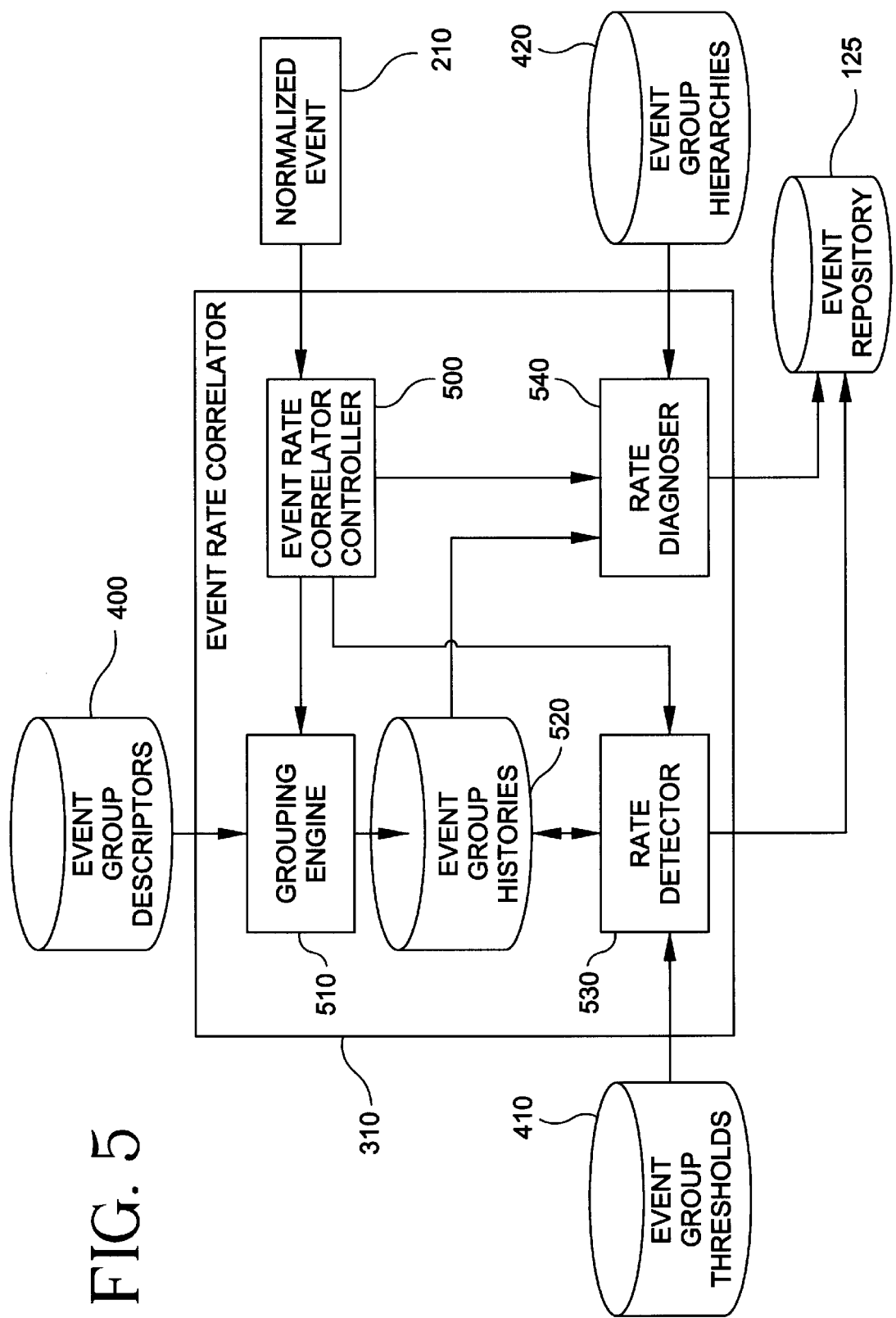
FIG. 5 is a block diagram illustrating an architecture of an event rate correlator according to one embodiment of the present invention.

Referring now to FIG. 5, a block diagram illustrates an architecture of an event rate correlator according to one embodiment of the present invention. Specifically, FIG. 5 illustrates the components of an event rate correlator, e.g., 310-1 through 310-N (FIG. 3). As shown, the event rate correlator comprises an event rate correlator controller 500, a grouping engine 510, an event rate histories repository 520, a rate detector 530 and a rate diagnoser 540. Thus, in operation, normalized events 210 are received by the event rate correlator controller 500 that determines the overall flow and scheduling for event processing. The grouping engine 510 determines the event groups to which the event belongs based on the event group descriptors 400. The event group history repository 520 maintains the count of events for each event group. The event rate detector 530 determines which event groups have excessive rates based on the event group thresholds 410. Excessive rates can result in new kinds of events that are themselves stored in the event repository 125. In addition, excessive event rates can result in invoking the rate diagnoser 540 that uses event group hierarchies 420 to determine the cause of excessive event rates.

Figure 6:
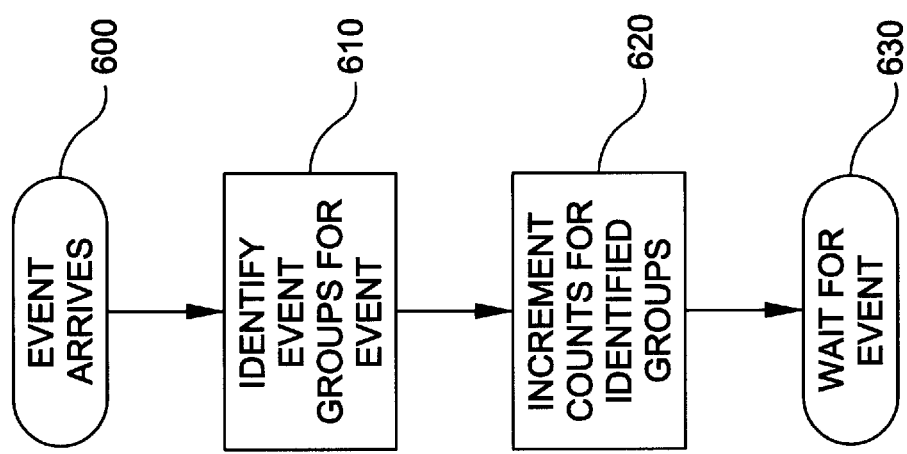
FIG. 6 is a flow diagram illustrating a method employed by a policy execution system when an event arrives according to one embodiment of the present invention.

Referring now to FIG. 6, a flow diagram illustrates a method employed by a policy execution system when an event arrives according to one embodiment of the present invention. That is, FIG. 6 depicts a method for processing an incoming event in the policy execution system 105 of the invention. In step 600, an event is delivered to the event rate correlator (e.g., 310-1 through 310-N in FIG. 3). In step 610, the event groups to which the event belongs are identified. This may be done in accordance with the grouping engine 510 (FIG. 5). In step 620, the count of events is incremented for each identified event group. This may be done in accordance with the rate detector 530 (FIG. 5). The correlator then waits for the next event, in step 630.

Figure 7:
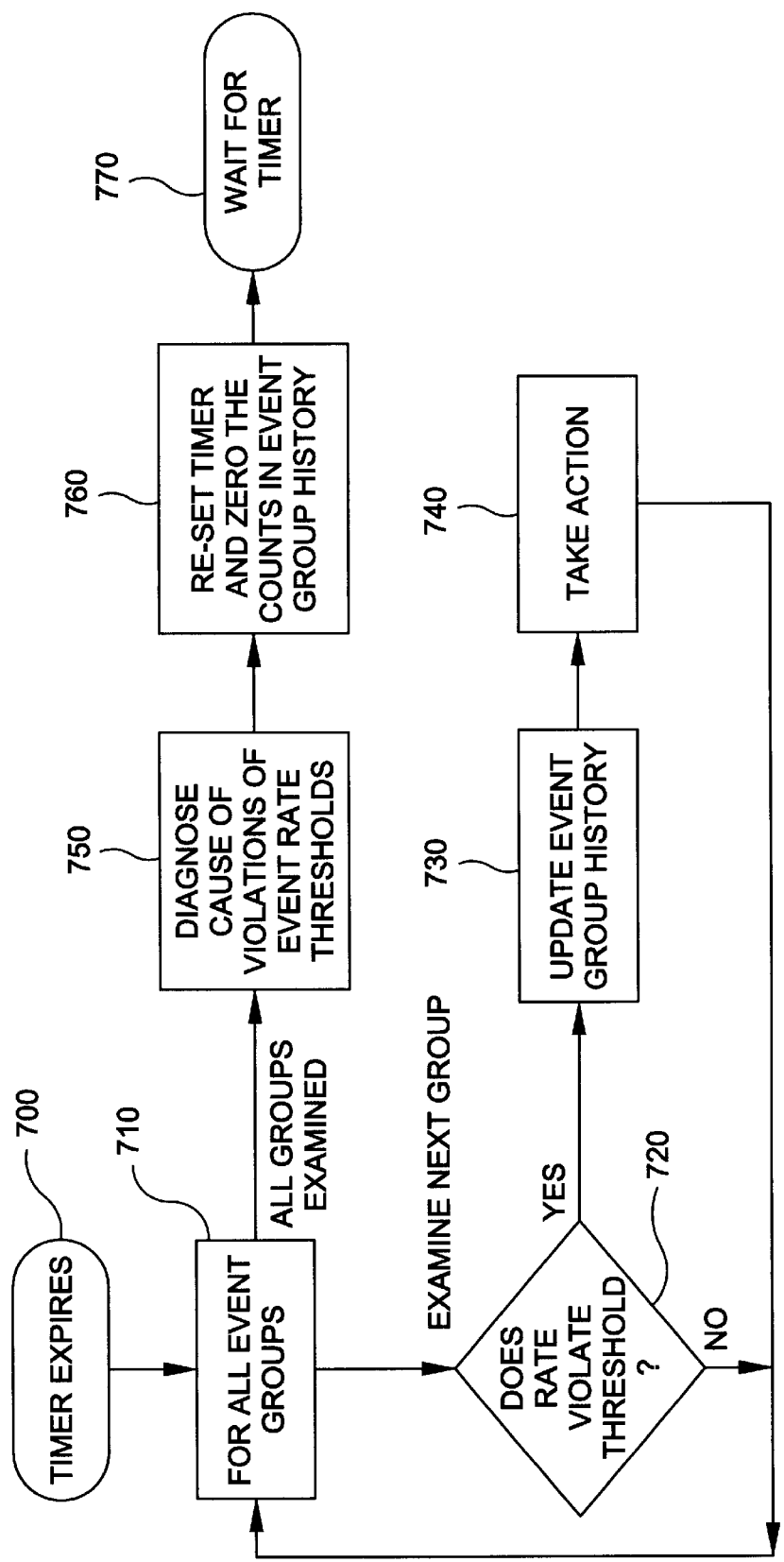
FIG. 7 is a flow diagram illustrating a method employed by a policy execution system for periodically checking event rates and diagnosing problems according to one embodiment of the present invention.

Referring now to FIG. 7, a flow diagram illustrates a method employed by a policy execution system for periodically checking event rates and diagnosing problems according to one embodiment of the present invention. That is, FIG. 7 details a method for determining excessive event rates and diagnosing their cause. In step 700, a timer expires indicating that event counts should be checked. In step 710, an iteration begins across all event groups. For each group, step 720 checks to see if the number of events received since the last timer expiration exceeds the event rate threshold specified in sub-repository 410 (FIG. 4). If it does, then in step 730, the event group history (repository 520) is updated to indicate the time and event group for which a threshold violation is detected. Further, in step 740, the action that corresponds to the event group (sub-repository 430) is then forwarded to the task executor 225 (FIG. 2). Once all event groups have been examined, in step 750, all event groups with threshold violations are diagnosed. This may result in generating new events that are forwarded to the policy execution user interface 230 (FIG. 2). In step 760, the timer is reset and event group counts are zeroed in the event group history. In step 770, the method again waits for the expiration of the timer. It is to be appreciated that the above steps may be performed by the rate detector 530 and rate diagnoser 540 in accordance with the event rate correlator controller 500 of FIG. 5.

Figure 8:
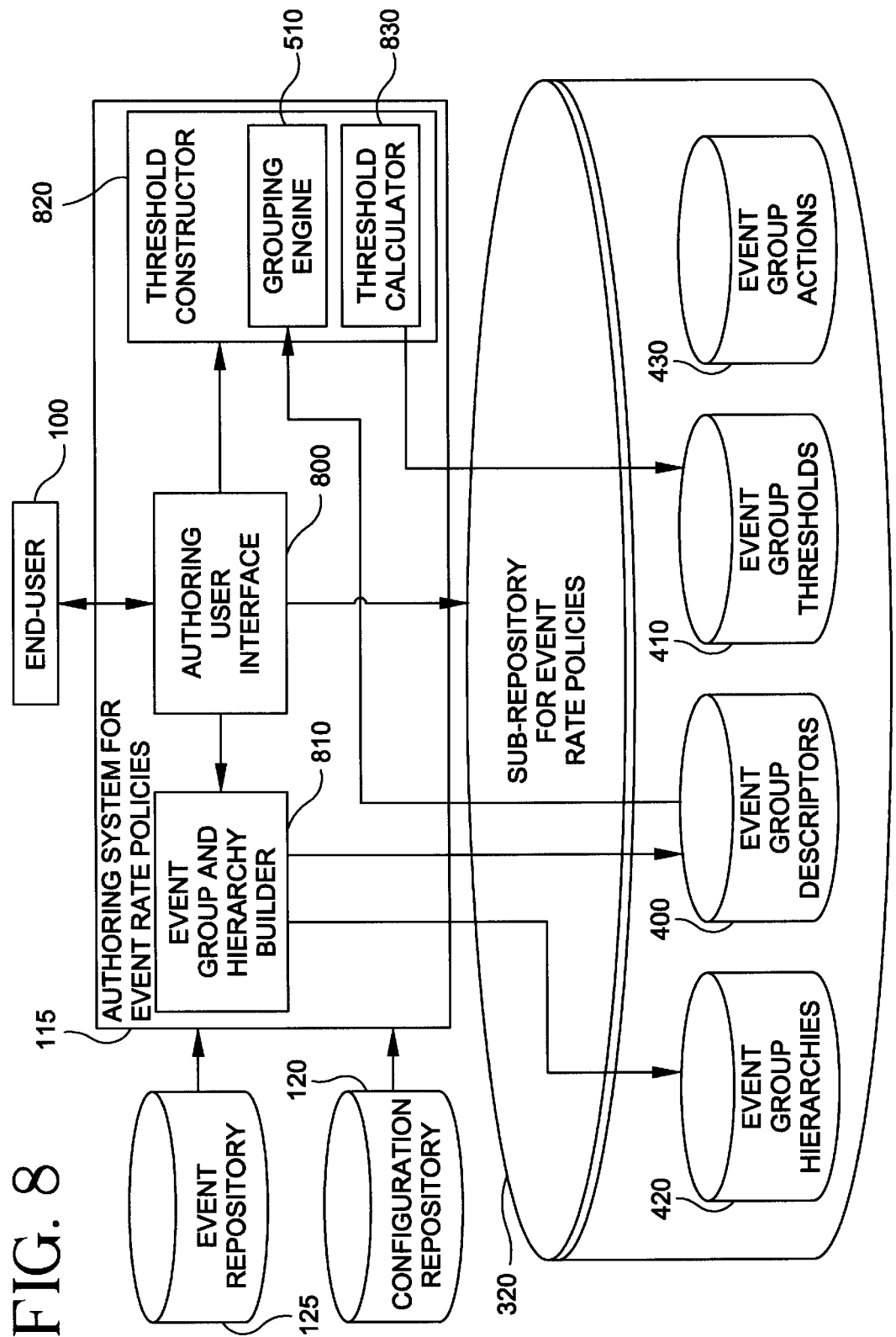
FIG. 8 is a block diagram illustrating an architecture of a system for authoring event rate policies according to one embodiment of the present invention.

Referring now to FIG. 8, a block diagram illustrates an architecture of a system for authoring event rate policies according to one embodiment of the present invention. Specifically, FIG. 8 depicts an overview of a policy authoring subsystem 115. The policy authoring system 115 comprises an authoring user interface 800, an event group and hierarchy builder 810 and a threshold constructor 820. The threshold constructor 820 comprises a threshold calculator 830 and the grouping engine 510 (FIG. 510). As will be explained, the policy authoring system 115 interfaces with some components of the policy execution system 105 and the overall event management system 102 previously described. Thus, the same reference numerals will be used to refer to these components. The authoring user interface 800 operates to permit the administrative end user 100 to construct and review event rate policies 320. The event group and hierarchy builder 810 operates to automate the construction of event group hierarchies (sub-repository 420) and event group descriptors (sub-repository 400). The threshold constructor 820 operates to automate the construction of event rate thresholds for excessive event rates. As mentioned, this component includes the grouping engine 510 and the threshold calculator 830.

Figure 9:
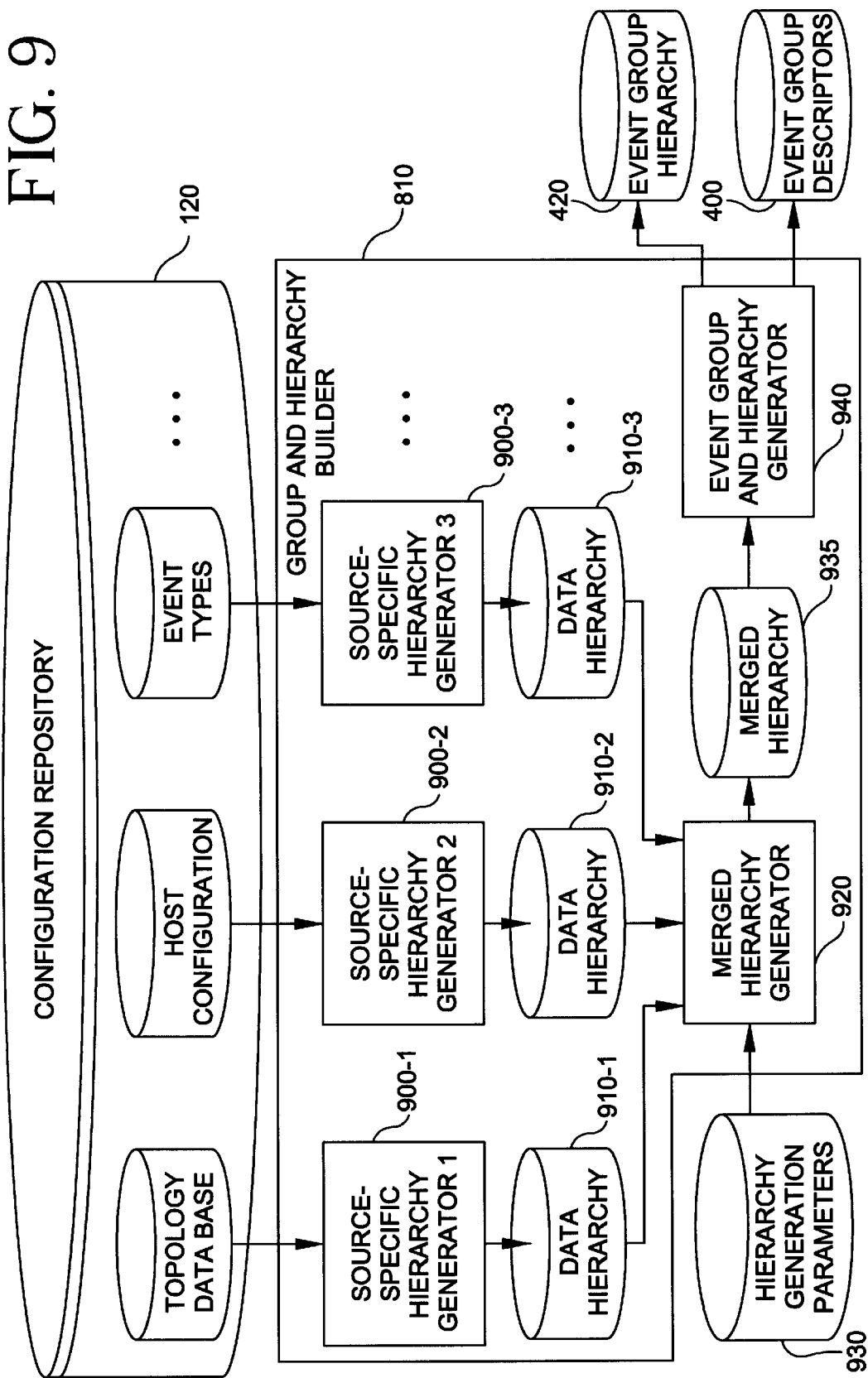
FIG. 9 is a block diagram illustrating elements of a group and hierarchy builder for authoring event rate policies according to one embodiment of the present invention.

Referring now to FIG. 9, a block diagram illustrates elements of a group and hierarchy builder for authoring event rate policies according to one embodiment of the present invention. Specifically, FIG. 9 shows an internal architecture of the group and hierarchy builder 810 (FIG. 8). As shown, the group and hierarchy builder 810 comprises source-specific hierarchy generators 900-1 through 900-3. It is to be understood that more than three such generators may be employed. The group and hierarchy builder 810 also comprises data hierarchy repositories 910-1 through 910-3. It is to be understood that more than three such repositories may be employed. Further, the builder 810 comprises a merged hierarchy generator 920, a hierarchy generation parameters repository 930, a merged hierarchy repository 935 and an event group and hierarchy generator 940. In operation, the source-specific hierarchy generators take as input, from the configuration repository, configuration information (e.g., topologies) and generate hierarchies of values of an attribute (e.g., host names) that are placed into the data hierarchy repository 910. It is to be appreciated that each generator processes the input to construct a hierarchy of names. For topology, the hierarchy might include arcs from subnets to hosts on the subnet. For configuration, the hierarchy might include arcs from OS (operating system) types to release levels of the OS. Then, the merged hierarchy generator 920 inputs the data hierarchy and the hierarchy generation parameters 930 to produce the merged hierarchies 935. Such merging of hierarchies is well understood art for manipulating graphs, see, e.g., Wataru Mayeda, "Graph Theory," Wiley, 1972, the disclosure of which is incorporated by reference herein. The generation parameters specify information that controls the manner in which the merged hierarchy is constructed, such as the number of combinations of hierarchy elements that should be considered (so that the merged hierarchy is not too, complex). The event group and hierarchy generator 940 inputs the merged hierarchy and outputs the event group descriptors (for repository 400) and event group hierarchies (for repository 420). The event group descriptors are constructed in a straightforward way from the labels of nodes in the merged hierarchy graph by using the values of each attribute as constraints in the event group descriptors. The event group hierarchies are constructed in a straightforward manner by imposing the same parent-child relationships that are present in the merged hierarchy. That is, consider an event group descriptor A. This consists of $A(1), \ldots A(M)$, a predicate from each source specific hierarchy (e.g., $A(1)$ might be "resides on subnet 13.2.45" and $A(2)$ might be "is a WIN95 machine"). Similarly, event group descriptor B has components $B(1), \ldots, B(A(M))$ (e.g., $B(1)$ might be "has IP address 13.2.45.10"). Then, there is an arc from A to B if there is at least one j such that $A(j)$ is at a higher level in the hierarchy j than $B(j)$ and there is no k such that $B(k)$ is at a higher level than $A(k)$. Thus, event group descriptors and event group hierarchies may be generated from hierarchy cross products.

Figure 10:
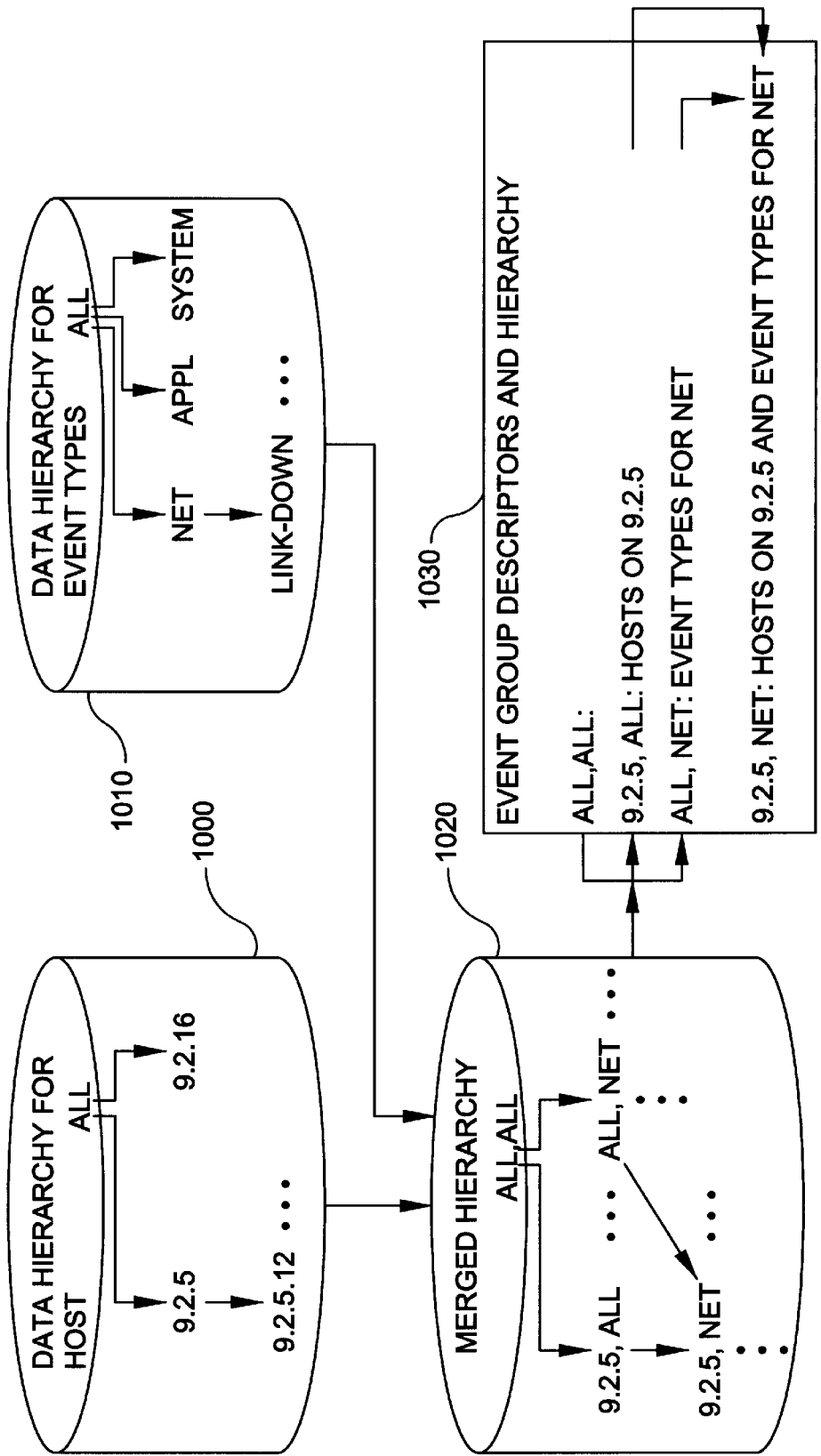
FIG. 10 is a diagram illustrating an exemplary operation of a policy authoring system according to one embodiment of the present invention.

Referring now to FIG. 10, a diagram illustrates an exemplary operation of a policy authoring system according to one embodiment of the present invention. Specifically, FIG. 10 depicts how the policy authoring system transforms information about topology and event types into event group descriptors and hierarchies. As shown, blocks 1000 and 1010 are data hierarchies produced by source-specific hierarchy engines, e.g., generators 900-1 through 900-3 in FIG. 9, for the host attribute and the event type attribute, respectively. Block 1020 is a merged hierarchy 935 constructed by the merged hierarchy generator 920. Block 1030 contains the event group descriptors 400 and event group hierarchy 420 built from this merged hierarchy.

Figure 11:
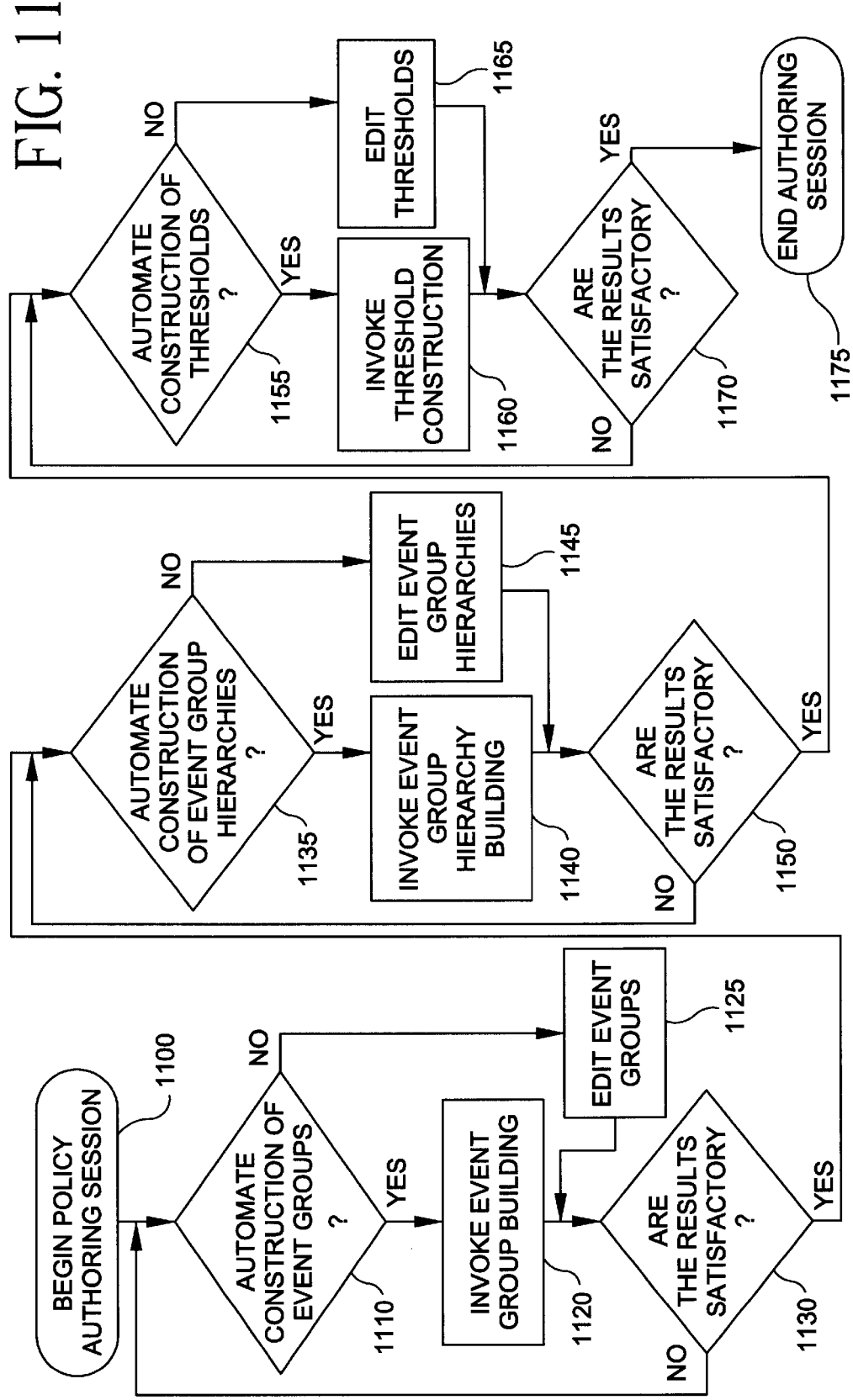
FIG. 11 is a flow diagram illustrating a method for using a policy authoring system according to one embodiment of the present invention.

Referring now to FIG. 11, a flow diagram illustrates a method for using a policy authoring system according to one embodiment of the present invention. Specifically, FIG. 11 depicts a method of the authoring system by which event group descriptors, event group hierarchies, and thresholds may be constructed. In step 1100, the end-user initiates an authoring session via the authoring user interface 800 (FIG. 8). In step 1110, the end-user decides if event-group construction is to be automated. If so, in step 1120, the event group building (in accordance with builder module 810) is invoked. If not, then in step 1125, the user edits the event group descriptors. In either case, the user decides, in step 1130, if the results are satisfactory. If they are, the method continues at step 1135. If not, the user returns to step 1110. In step 1135, the end-user decides if the construction of event-group hierarchies is to be automated. If so, then in step 1140, the event group hierarchy building (in accordance with builder module 810) is invoked. If not, then in step 1145, the user edits the event group hierarchies. In either case, the user decides, in step 1150, if the results are satisfactory. If they are, the method continues at step 1155. If not, the user returns to step 1135. In step 1155, the end-user decides if the construction of thresholds is to be automated. If so, then in step 1160, the automated threshold construction (in accordance with threshold constructor 820) is invoked. If not, then in step 1165, the user edits the thresholds. In either case, the user decides, in step 1170, if the results are satisfactory. If they are, the method terminates at block 1175. If not, the user returns to step 1155.

It is to be appreciated that while the foregoing method is a preferred embodiment, various others will be evident to those of ordinary skill in the art given the teachings herein. For example, the end-user may proceed directly from constructing event groups (step 1130) to constructing event rate thresholds (step 1155). Also, when checking if the event group hierarchy is satisfactory (step 1150), the flow may return the user back constructing the event group descriptors (step 1110).

Figure 12:
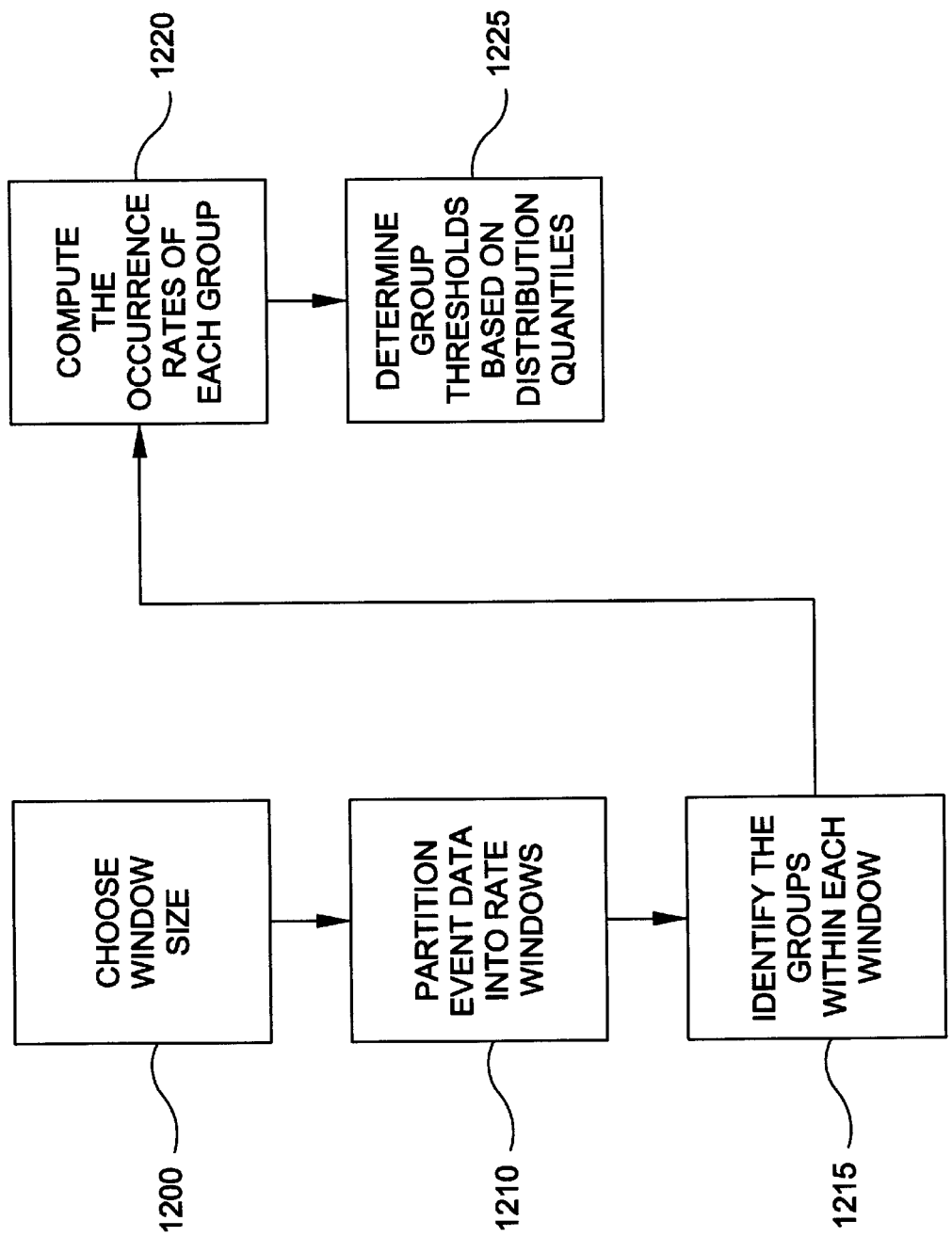
FIG. 12 is a flow diagram illustrating a method for automated construction of event rate thresholds according to one embodiment of the present invention.

Referring now to FIG. 12, a flow diagram illustrates a method for automated construction of event rate thresholds according to one embodiment of the present invention. Specifically, FIG. 12 depicts the method for computing event rate thresholds as used in threshold calculator 830 (FIG. 8). In step 1200, a window size is chosen, e.g., possibly based on an external parameter. Then, in step 1210, the data in the event repository 125 is partitioned based on the window size. The groups within each window are identified in step 1215. Step 1220 determines the event rates of each event group in each window. Step 1225 computes the quantiles of the event rates, selecting the rate at a specific quantile (e.g., as specified by an external parameter) as the threshold. Straightforward extensions of this technique can be used to construct quantiles for event rates that, for example, are too small, lie within an interval, or lie outside an interval.

Figure 13:
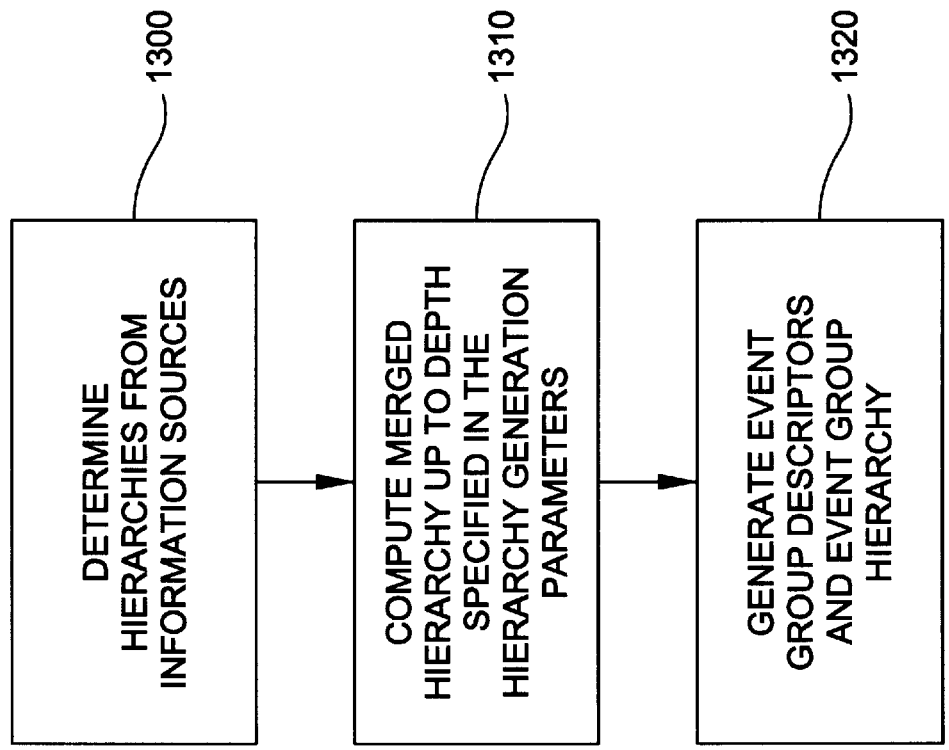
FIG. 13 is a flow diagram illustrating a method for use by a group and hierarchy builder according to one embodiment of the present invention.

Referring now to FIG. 13, a flow diagram illustrates a method for use by a group and hierarchy builder according to one embodiment of the present invention. Specifically, FIG. 13 depicts a method used by the group and hierarchy builder component 810 in the system for authoring event rate policies shown in FIG. 8. Step 1300 determines the hierarchies from other information sources, e.g., topology, event types. Step 1310 computes the merged hierarchy based on the hierarchy generation parameters (930 in FIG. 9). Lastly, in step 1320, the event group descriptors and event group hierarchy are generated.

Figure 14:
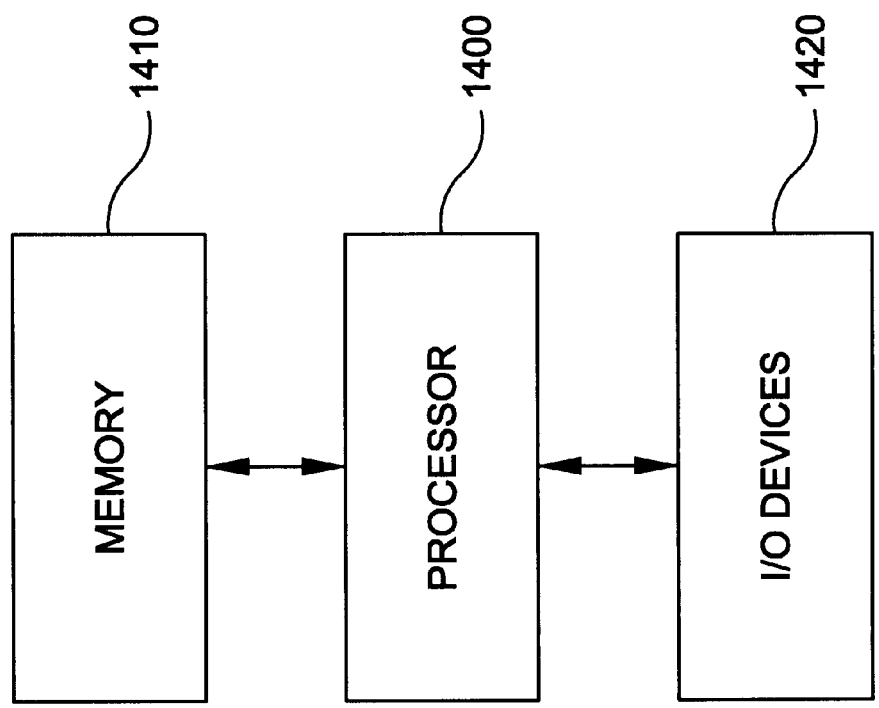
FIG. 14 is a block diagram illustrating a generalized hardware architecture of a computer system suitable for implementing an event management system according to the present invention.

Referring now to FIG. 14, a block diagram is shown illustrating a generalized hardware architecture of a computer system suitable for implementing the various functional components/modules of an event management system 102 as depicted in the figures and explained in detail herein. It is to be understood that the individual components of the event management system 102, namely, the policy execution subsystem 105, the policy repository 110, the policy authoring subsystem 115, the configuration repository 120 and the event repository 125 may be implemented on one such computer system, or on more than one separate such computer systems. Also, individual components of the subsystems and repositories may be implemented on separate such computer systems.

As shown, the computer system may be implemented in accordance with a processor 1400, a memory 1410 and I/O devices 1420. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for entering data to the processing unit, and/or one or more output devices, e.g., CRT display and/or printer, for presenting results associated with the processing unit. For example, user interfaces of the system employed by an end-user may be realized through such I/O devices. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. Apparatus for executing one or more operational policies associated with management of events occurring in one or more operations being managed, the apparatus comprising:

at least one processor operative to: (i) determine when a rate of events of a particular type occurring in the one or more operations being managed substantially violates a predetermined event rate criterion; and (ii) taking action associated with a corresponding operational policy based on a result of the determination; and a memory, coupled to the at least one processor, for storing at least a portion of results associated with the execution of the one or more operational policies.

2. The apparatus of claim 1, wherein the determination of substantial violation of the predetermined event rate criterion further comprises, for a given event, identifying an event group to which the event belongs.

3. The apparatus of claim 2, wherein the event group is identified based on an event group descriptor associated with the event.

4. The apparatus of claim 2, wherein the determination of substantial violation of the predetermined event rate criterion further comprises, for an event group, tracking the number of events received that are associated with that particular event group.

5. The apparatus of claim 4, wherein the determination of substantial violation of the predetermined event rate criterion further comprises, for an event group, comparing the number of events received that are associated with that particular event group with the predetermined event rate criterion to make the determination whether the rate of events substantially violates the predetermined event rate criterion.

6. The apparatus of claim 1, wherein the predetermined event rate criterion comprises a threshold value.

7. The apparatus of claim 6, wherein the event rate substantially violates the threshold value when the event rate is not at least greater than the threshold value.

8. The apparatus of claim 6, wherein the event rate substantially violates the threshold value when the event rate is not at least less than the threshold value.

9. The apparatus of claim 1, wherein the predetermined event rate criterion comprises a threshold range.

10. The apparatus of claim 9, wherein the event rate substantially violates the threshold range when the event rate is not inside the threshold range.

11. The apparatus of claim 9, wherein the event rate substantially violates the threshold range when the event rate is not outside the threshold range.

12. The apparatus of claim 1, wherein an operational policy comprises an event group descriptor which specifies one or more conditions for inclusion of an event in an event group.

13. The apparatus of claim 1, wherein an operational policy comprises an event group threshold which quantifies what comprises substantial violation of the predetermined event rate criterion.

14. The apparatus of claim 1, wherein an operational policy comprises an event group hierarchy which provides a particular hierarchy associated with an event group.

15. The apparatus of claim 1, wherein an operational policy comprises an event group action which describes a task to execute when the predetermined event rate criterion is substantially violated.

16. The apparatus of claim 1, wherein the at least one processor is further operative to diagnose a cause of an event rate that substantially violates the predetermined event rate criterion.

17. The apparatus of claim 16, wherein diagnosis of the cause is based on an event group hierarchy.

18. The apparatus of claim 1, wherein the predetermined event rate criterion is based on historical data.

19. Computer-based apparatus for executing one or more operational policies associated with management of events occurring in one or more operations being managed, the apparatus comprising:
   a correlation engine operative to determine when a rate of events of a particular type occurring in the one or more operations being managed substantially violates a predetermined event rate criterion; and
   a task executor, coupled to the correlation engine, operative to take action associated with a corresponding operational policy based on a result of the determination.

20. The apparatus of claim 19, wherein the correlation engine comprises an event grouping engine operative to identify an event group to which a given event belongs based on an event group descriptor.

21. The apparatus of claim 19, wherein the correlation engine comprises a rate detector operative to detect the rate of occurrence of a given event and when the event rate substantially violates the predetermined event rate criterion.

22. Apparatus for authoring one or more operational policies associated with management of events occurring in one or more operations being managed, the apparatus comprising:
   at least one processor operative, in response to an end-user, to: (i) automatically construct one or more event groups, each group having an event group descriptor associated therewith which specifies one or more conditions for inclusion of an event in an event group; (ii) automatically construct one or more hierarchies, each hierarchy being associated with an event group; and (iii) automatically construct one or more event rate criteria, each criterion quantifying what comprises substantial violation of a predetermined event rate threshold; and
   a memory, coupled to the at least one processor, for storing at least a portion of results associated with the authoring of the one or more operational policies.

23. The apparatus of claim 22, wherein the at least one processor is further operative to permit the end-user to edit at least one of an event group, an event group hierarchy, and a threshold.

24. The apparatus of claim 22, wherein at least one of the event group and event group hierarchy are generated from topology information associated with the one or more operations being managed.

25. The apparatus of claim 22, wherein at least one of the event group and event group hierarchy are generated from host configuration information associated with the one or more operations being managed.

26. The apparatus of claim 22, wherein at least one of the event group and event group hierarchy are generated from event type information associated with the one or more operations being managed.

27. The apparatus of claim 22, wherein the at least one processor is further operative to update information associated with an event group descriptor upon receipt of a new event.

28. The apparatus of claim 22, wherein the predetermined event rate threshold comprises a threshold value.

29. The apparatus of claim 22, wherein the predetermined event rate threshold comprises a threshold range.

30. The apparatus of claim 22, wherein an operational policy comprises an event group descriptor, an event group threshold, an event group hierarchy, and an event group action which describes a task to execute when the event rate criterion is substantially violated.

31. The apparatus of claim 22, wherein the event rate criterion is based on historical data.

32. Computer-based apparatus for authoring one or more operational policies associated with management of events occurring in one or more operations being managed, the apparatus comprising:
   an end-user authoring interface;
   an event group and hierarchy building module operative to automatically construct one or more event groups in response to the end-user through the end-user authoring interface, each group having an event group descriptor associated therewith which specifies one or more conditions for inclusion of an event in an event group, and operative to automatically construct one or more hierarchies, each hierarchy being associated with an event group; and
   a threshold constructor operative to automatically construct one or more event rate criteria in response to the end-user through the end-user authoring interface, each criterion quantifying what comprises substantial violation of a predetermined event rate threshold.

33. A method of executing one or more operational policies associated with management of events occurring in one or more operations being managed, the method comprising the steps of:
   determining when a rate of events of a particular type occurring in the one or more operations being managed substantially violates a predetermined event rate criterion; and
   taking action associated with a corresponding operational policy based on a result of the determination.

34. The method of claim 33, wherein the determination of substantial violation of the predetermined event rate criterion further comprises, for a given event, identifying an event group to which the event belongs.

35. The method of claim 34, wherein the event group is identified based on an event group descriptor associated with the event.

36. The method of claim 34, wherein the determination of substantial violation of the predetermined event rate criterion further comprises, for an event group, tracking the number of events received that are associated with that particular event group.

37. The method of claim 36, wherein the determination of substantial violation of the predetermined event rate criterion further comprises, for an event group, comparing the number of events received that are associated with that particular event group with the predetermined event rate criterion to make the determination whether the rate of events substantially violates the predetermined event rate criterion.

38. The method of claim 33, wherein the predetermined event rate criterion comprises a threshold value.

39. The method of claim 38, wherein the event rate substantially violates the threshold value when the event rate is not at least greater than the threshold value.

40. The method of claim 38, wherein the event rate substantially violates the threshold value when the event rate is not at least less than the threshold value.

41. The method of claim 33, wherein the predetermined event rate criterion comprises a threshold range.

42. The method of claim 41, wherein the event rate substantially violates the threshold range when the event rate is not inside the threshold range.

43. The method of claim 41, wherein the event rate substantially violates the threshold range when the event rate is not outside the threshold range.

44. The method of claim 33, wherein an operational policy comprises an event group descriptor which specifies one or more conditions for inclusion of an event in an event group.

45. The method of claim 33, wherein an operational policy comprises an event group threshold which quantifies what comprises substantial violation of the predetermined event rate criterion.

46. The method of claim 33, wherein an operational policy comprises an event group hierarchy which provides a particular hierarchy associated with an event group.

47. The method of claim 33, wherein an operational policy comprises an event group action which describes a task to execute when the predetermined event rate criterion is substantially violated.

48. The method of claim 33, further comprising the step of diagnosing a cause of an event rate that substantially violates the predetermined event rate criterion.

49. The method of claim 48, wherein diagnosis of the cause is based on an event group hierarchy.

50. The method of claim 33, wherein the predetermined event rate criterion is based on historical data.

51. A method of authoring one or more operational policies associated with management of events occurring in one or more operations being managed, the method comprising the steps of:
   automatically constructing one or more event groups, each group having an event group descriptor associated therewith which specifies one or more conditions for inclusion of an event in an event group;
   automatically constructing one or more hierarchies, each hierarchy being associated with an event group; and
   automatically constructing one or more event rate criteria, each criterion quantifying what comprises substantial violation of a predetermined event rate threshold.

52. The method of claim 51, further comprising the step of permitting the end-user to edit at least one of an event group, an event group hierarchy, and a threshold.

53. The method of claim 51, wherein at least one of the event group and event group hierarchy are generated from topology information associated with the one or more operations being managed.

54. The method of claim 51, wherein at least one of the event group and event group hierarchy are generated from host configuration information associated with the one or more operations being managed.

55. The method of claim 51, wherein at least one of the event group and event group hierarchy are generated from event type information associated with the one or more operations being managed.

56. The method of claim 51, further comprising the step of updating information associated with an event group descriptor upon receipt of a new event.

57. The method of claim 51, wherein the predetermined event rate threshold comprises a threshold value.

58. The method of claim 51, wherein the predetermined event rate threshold comprises a threshold range.

59. The method of claim 51, wherein an operational policy comprises an event group descriptor, an event group threshold, an event group hierarchy, and an event group action which describes a task to execute when the event rate criterion is substantially violated.

60. The method of claim 51, wherein the event rate criterion is based on historical data.

61. An article of manufacture for executing one or more operational policies associated with management of events occurring in one or more operations being managed, comprising a machine readable medium containing one or more programs which when executed implement the steps of:
   determining when a rate of events of a particular type occurring in the one or more operations being managed substantially violates a predetermined event rate criterion; and
   taking action associated with a corresponding operational policy based on a result of the determination.

62. An article of manufacture for authoring one or more operational policies associated with management of events occurring in one or more operations being managed, comprising a machine readable medium containing one or more programs which when executed implement the steps of:
   automatically constructing one or more event groups, each group having an event group descriptor associated therewith which specifies one or more conditions for inclusion of an event in an event group;
   automatically constructing one or more hierarchies, each hierarchy being associated with an event group; and
   automatically constructing one or more event rate criteria, each criterion quantifying what comprises substantial violation of a predetermined event rate threshold.

* * * * *